US012755596B2

(12) United States Patent
Yoon

(10) Patent No.: US 12,755,596 B2
(45) Date of Patent: Oct. 6, 2026

(54) BANKNOTE PROCESSING APPARATUS

(71) Applicant: HYOSUNG TNS INC., Seoul (KR)

(72) Inventor: Seul Hae Yoon, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 657 days.

(21) Appl. No.: 18/276,079

(22) PCT Filed: Feb. 21, 2022

(86) PCT No.: PCT/KR2022/002539

§ 371 (c)(1),
(2) Date: Aug. 7, 2023

(87) PCT Pub. No.: WO2022/182086

PCT Pub. Date: Sep. 1, 2022

(65) Prior Publication Data

US 2024/0304052 A1 Sep. 12, 2024

(30) Foreign Application Priority Data

Feb. 25, 2021 (KR) ........................ 10-2021-0025667
Feb. 25, 2021 (KR) ........................ 10-2021-0025668

(51) Int. Cl.
*G07D 11/40* (2019.01)
*B65H 5/36* (2006.01)
*G07D 11/16* (2019.01)

(52) U.S. Cl.
CPC ............... *G07D 11/40* (2019.01); *B65H 5/36* (2013.01); *G07D 11/16* (2019.01); (Continued)

(58) Field of Classification Search
CPC .... G07D 11/40; G07D 11/16; G07D 2211/00; G07D 11/10; B65H 5/36; B65H 2402/31; (Continued)

(56) References Cited

FOREIGN PATENT DOCUMENTS

WO WO 2012056789 A1 * 5/2012 ............. G07D 11/16

OTHER PUBLICATIONS

English Translation of WO 2012056789 A1 (Year: 2012).*
Search Report issued in corresponding European application No. 22760004.6.

* cited by examiner

*Primary Examiner* — Jeffrey A Shapiro
(74) *Attorney, Agent, or Firm* — BACON & THOMAS, PLLC

(57) ABSTRACT

A banknote processing apparatus includes a body in which a banknote is stored, a main frame that moves forward or rearward between a first position located on an upper side of the body and a second position spaced forward from the upper side of the body, a lower transport module that vertically rotates at one end of the main frame between a horizontal state and a downwardly inclined state, a first locking member that regulates the rotation of the lower transport module, a link member having a predetermined length on the main frame in a front-rear direction and moving forward or rearward within a predetermined gap range, a rotation member that rotates in conjunction with the forward or rearward movement of the link member, and a second locking member that locks the link member in a state in which the lower transport module has rotated downward and unlocks the link member in a state in which the lower transport module has rotated upward.

16 Claims, 17 Drawing Sheets

(52) U.S. Cl.
CPC .. *B65H 2402/31* (2013.01); *B65H 2701/1912* (2013.01); *G07D 2211/00* (2013.01)

(58) Field of Classification Search
CPC B65H 2701/1912; G07F 19/205; G07F 19/20
See application file for complete search history.

BANKNOTE PROCESSING APPARATUS

BACKGROUND

1. Field of the Invention

The present disclosure relates to a banknote processing apparatus, and more particularly, to a banknote processing apparatus that may stably retract a banknote transport module into an upper portion of a body after maintenance work.

2. Discussion of Related Art

Financial automation machines are automated apparatuses that may assist with basic financial services such as deposit or withdrawal without a bank employee regardless of a location and time in relation to financial services. A banknote processing apparatus including a banknote transport module for providing a transport path for transporting a banknote and a body in which the banknote is stored is provided inside the financial automation machine. The banknote transport module moves forward or rearward between a first position in which the banknote transport module is positioned on an upper side of the body and a second position in which the banknote transport module is spaced forward from the upper side of the body.

Referring to FIGS. 1 and 2, in a banknote transport module 1 provided in the financial automation machine according to the related art, a transport path is provided between an upper transport module 10 positioned on the upper side and a lower transport module 20 positioned on the lower side, the upper transport module 10 includes a structure that may rotate upward about a main frame 30, and the lower transport module 20 includes a structure that may rotate downward about the main frame 30.

For maintenance of an inside of the banknote transport module 1, in a state in which the banknote transport module 1 has moved forward to the second position, the upper transport module 10 rotates upward, the lower transport module 20 rotates downward, and thus a workspace for maintenance should be secured at upper and lower portions of the transport path.

After the maintenance of the transport module 1, the upper transport module 10 rotates downward and is fixed to an upper portion of the main frame 30, and the lower transport module 20 rotates upward and is fixed to a lower portion of the main frame 30.

Since the lower transport module 20 is installed in the lower portion of the main frame 30 and is covered by the main frame 30, it is difficult for an operator to easily visually identify the lower transport module 20. Thus, when it is not identified whether the lower transport module 20 is closed in a normal position and the transport module 1 slidably moves to the first position, the lower transport module 20 that would not be properly closed may collide with the body, and thus the device may be damaged.

The related art related to a transport path opening/closing device of the financial automation machine is disclosed in Korean Patent Application Publication No. 10-2011-0031015.

SUMMARY OF THE INVENTION

The present disclosure is directed to providing a banknote processing apparatus in which a lower transport module moves only in a state in which the lower transport module is locked to a main frame and completely closed and thus a banknote transport module is stably retracted into an upper portion of a body after maintenance work.

According to an aspect of the present invention, there is provided a banknote processing apparatus comprising: a body in which a banknote is stored and a catching step is formed at an upper portion of a front surface thereof; a main frame that moves forward or rearward between a first position located on an upper side of the body and a second position spaced forward from the upper side of the body; a lower transport module that vertically rotates about a hinge part provided at one end of the main frame between a horizontal state and a downwardly inclined state and forms a lower portion of a transport path through which the banknote is transported; a first locking member configured to lock or unlock the other end of the lower transport module to regulate the rotation of the lower transport module; a link member having a predetermined length on the main frame in a front-rear direction and moving forward or rearward within a predetermined gap range; a rotation member connected to the link member in the main frame to rotate in conjunction with the forward or rearward movement of the link member, configured to rotate to come into contact with an upper surface of the body when the lower transport module moves to the first position, and configured to rotate to come into contact with the catching step at the upper portion of the front surface of the body when the lower transport module moves to the second position; and a second locking member that is locked to prevent the forward or rearward movement of the link member in a state in which the lower transport module has rotated downward and unlocked to enable the forward or rearward movement of the link member in a state in which the lower transport module has rotated upward.

The first locking member includes a hook part that is caught by a catching protrusion provided at the other end of the main frame in a state in which the lower transport module has rotated upward and is uncaught from the catching protrusion in a state in which the lower transport module 130 has rotated downward, and the first locking member is provided to move forward or rearward within the predetermined gap range in the front-rear direction.

In a state in which the lower transport module has moved to the first position and thus the rotation member has rotated to come into contact with the upper surface of the body, the link member moves forward and is thus operated to prevent movement of the hook part in the front-rear direction because a front end of the link member is in contact with a rear end surface of the hook part, and in a state in which the lower transport module has moved to the second position and thus the rotation member has rotated to come into contact with the catching step at the upper portion of the front surface of the body, the link member moves rearward and is thus operated to enable the movement of the hook part in the front-rear direction because a predetermined gap L is formed between the front end of the link member and the rear end surface of the hook part.

The rotation member is connected to a rear end of the link member and rotates to come into contact with the catching step at the upper portion of the front surface of the body when both the main frame and the lower transport module move to the second position.

The rotation member includes: a body plate; a hinge shaft coupled to an upper portion of the body plate, rotatably connected to a rotation member support piece provided at the other end of the main frame, and forming a center of rotation of the rotation member; an intermediate shaft coupled to a middle portion of the body plate and inserted into an intermediate shaft insertion hole formed in a slot shape in a vertical direction at a rear end of the link member; a roller support shaft coupled to a lower portion of the body plate; and a roller rotatably coupled to the roller support shaft and in contact with the upper surface of the body or the catching step at the upper portion of the front surface of the body.

The banknote processing apparatus further comprising: a first elastic member that elastically supports the link member so that the link member is pulled rearward.

The second locking member is provided in the link member to be vertically rotatable.

The second locking member includes: a body part rotatably provided in the link member; a shaft forming a center of rotation of the body part and coupled to the link member; and a second elastic member that elastically supports the body part in a downwardly rotating direction.

A protrusion is formed on one side of the body part, and a side frame positioned such that an upper end thereof is in contact with a lower end of the protrusion in a state in which the lower transport module has rotationally moved upward is provided on the other side of the lower transport module.

A through-hole providing a passage through which the body part vertically passes and moves is formed in the main frame.

In a state in which the lower transport module has rotated upward and moved to the first position, an upper end of the side frame is in contact with the protrusion to move the body part of the second locking member so that the body part rotates upward, the link member moves forward so that the body part of the second locking member is positioned on an upper surface of the main frame, and thus an unlocked state in which the link member is able to move forward or rearward is formed, and in a state in which the lower transport module has moved to the second position and rotated downward, the side frame is spaced apart from the protrusion, the link member moves rearward, the body part of the second locking member passes through the through-hole and rotates downward under an elastic force of the second elastic member and is thus caught by a side catching part of the main frame provided on one side of the through-hole, and thus a locking state in which the movement of the link member in the front-rear direction is prevented is formed.

The second locking member is elevatably provided on the main frame.

The second locking member includes: a body part elevatably provided on the main frame; a support rod configured to guide elevation movement of the body part; and a second elastic member having both ends supported by an upper end of the support rod and an upper surface of the body part to elastically support the body part in a direction toward an upper surface of the main frame.

A protrusion is formed on one side of the body part, and a side frame positioned such that an upper end thereof is in contact with a lower end of the protrusion in a state in which the lower transport module has rotationally moved upward is provided on the other side of the lower transport module.

A catching piece is formed on the other side of the body part, and a through-hole providing a passage through which the catching piece vertically passes and moves is formed in the link member.

In a state in which the lower transport module has rotated upward and moved to the first position, an upper end of the side frame is in contact with the protrusion to move the body part of the second locking member upward, the link member moves forward so that the catching piece of the second locking member is positioned on an upper surface of the link member, and thus an unlocked state in which the link member is able to move forward or rearward is formed, and in a state in which the lower transport module has moved to the second position and rotated downward, the side frame is spaced apart from the protrusion, the link member moves rearward, the catching piece of the second locking member passes through the through-hole and rotates downward under an elastic force of the second elastic member and is thus caught by a side catching part of the link member provided on one side of the through-hole, and thus a locking state in which the movement of the link member in the front-rear direction is prevented is formed.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
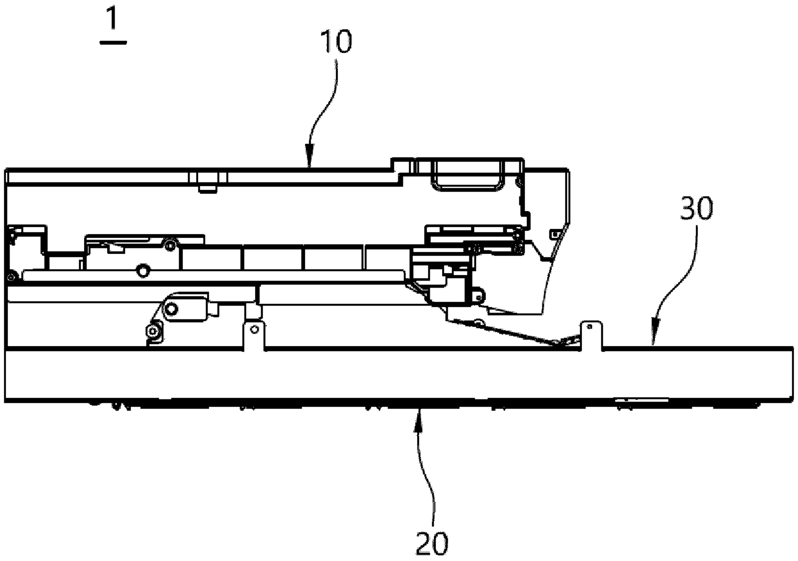
FIG. 1 is a view illustrating a state in which a banknote transport module according to the related art is closed.
Figure 2:
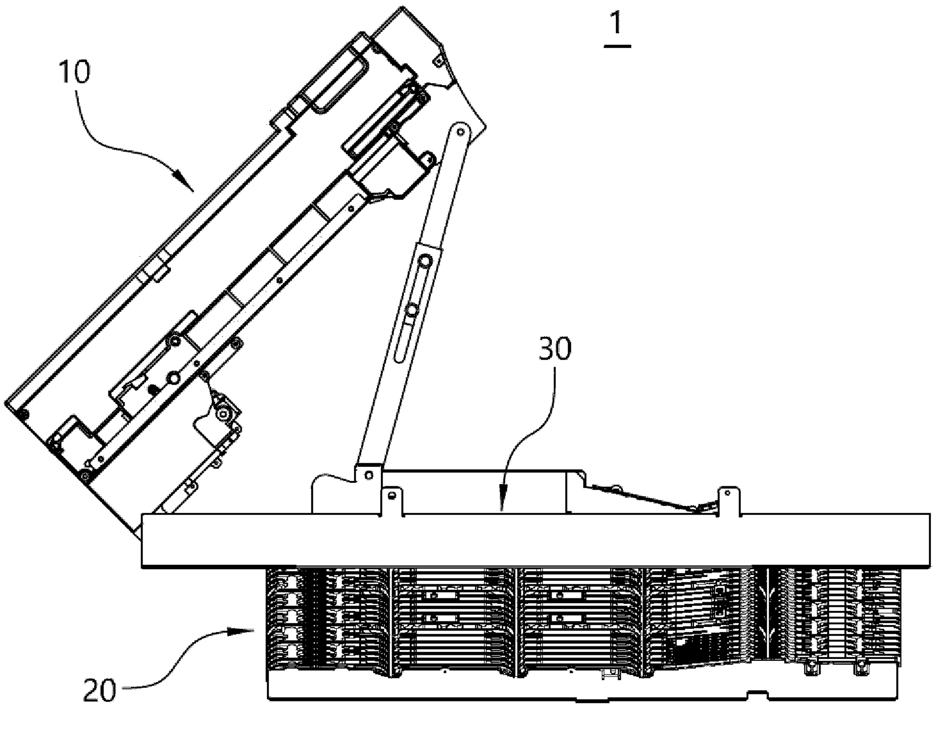
FIG. 2 is a view illustrating a state in which the banknote transport module according to the related art is open.

Hereinafter, configurations and operations of exemplary embodiments of the present disclosure will be described in detail with reference to the accompanying drawings.

A banknote processing apparatus 100 according to the present disclosure includes a body in which a banknote is stored and a catching step 112 is formed at an upper portion of a front surface thereof, a main frame 120 that may move forward or rearward between a first position located on an upper side of the body 110 and a second position spaced forward from the upper side of the body 110, a lower transport module 130 that may vertically rotate about a hinge part 121 provided at one end of the main frame 120 between a horizontal state and a downwardly inclined state and forms a lower portion of a transport path through which the banknote is transported, a first locking member 140 that locks or unlocks the other end of the lower transport module 130 to regulate the rotation of the lower transport module 130, a link member 150 that has a predetermined length on the main frame 120 in a front-rear direction and moves forward or rearward within a predetermined gap range, a rotation member 160 that is connected to the link member 150 in the main frame 120 to rotate in conjunction with the forward or rearward movement of the link member 150, rotates to come into contact with an upper surface of the body 110 when the lower transport module 130 moves to the first position, and rotates to come into contact with the catching step 112 at the upper portion of the front surface of the body 110 when the lower transport module 130 moves to the second position, and a second locking member 180 that is locked to prevent the forward or rearward movement of the link member 150 in a state in which the lower transport module 130 has rotated downward and is unlocked to enable the forward or rearward movement of the link member 150 in a state in which the lower transport module 130 has rotated upward.

In an embodiment, the second locking member 180 is provided in the link member 150 to be vertically rotatable.

Figure 3:
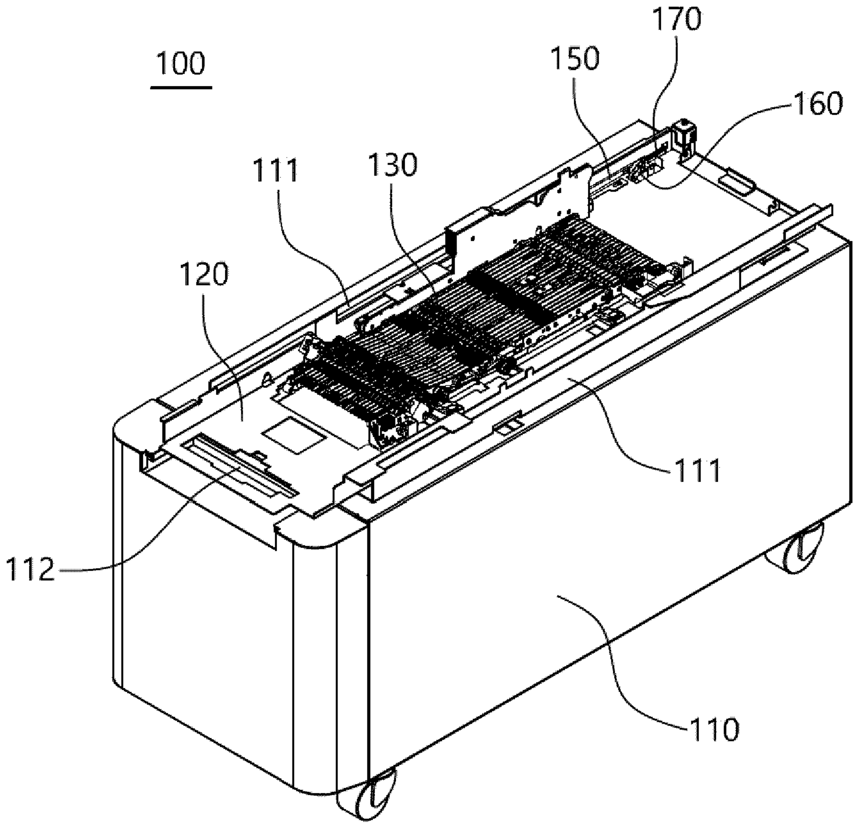
FIG. 3 is a perspective view illustrating a state in which a main frame and a lower transport module are retracted to a first position located on an upper side of a body in a banknote processing apparatus according to the present disclosure.
Figure 4:
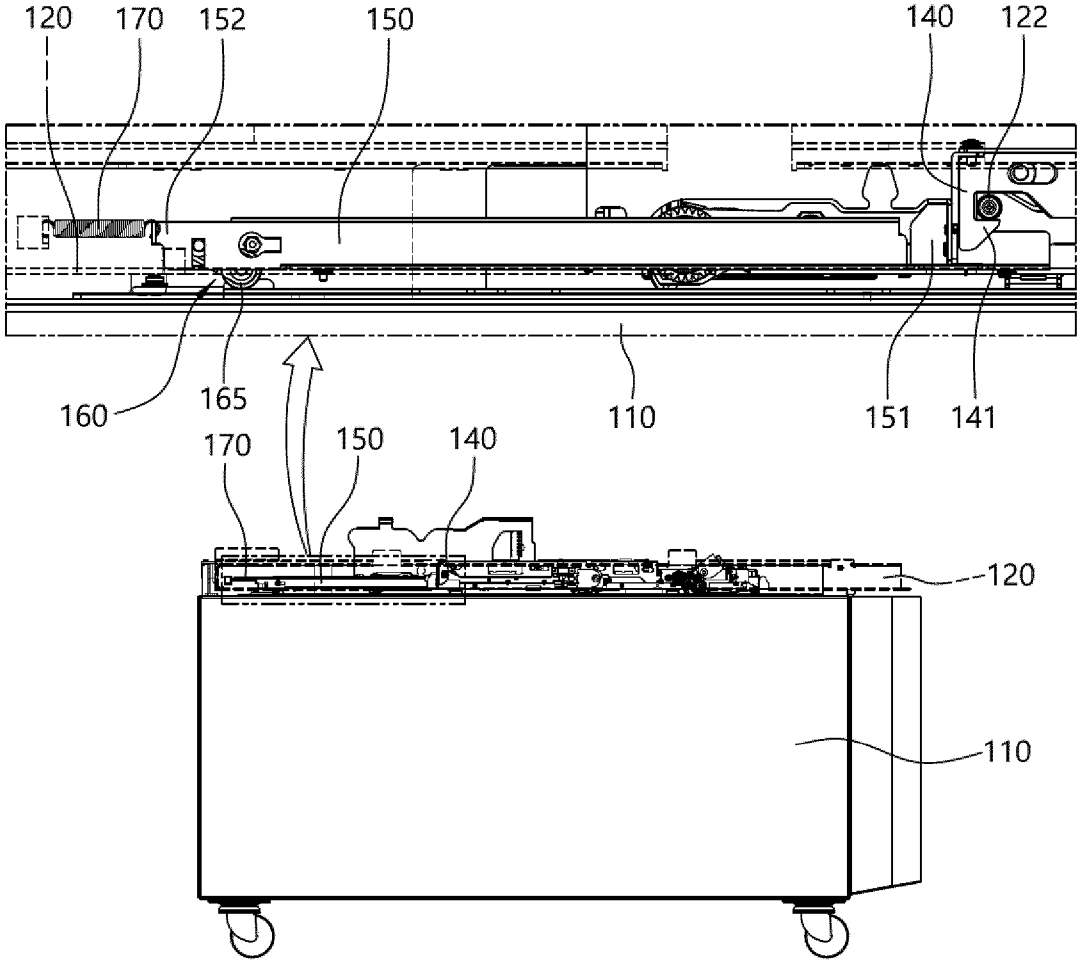
FIG. 4 is a left side view of FIG. 3.
Figure 5:
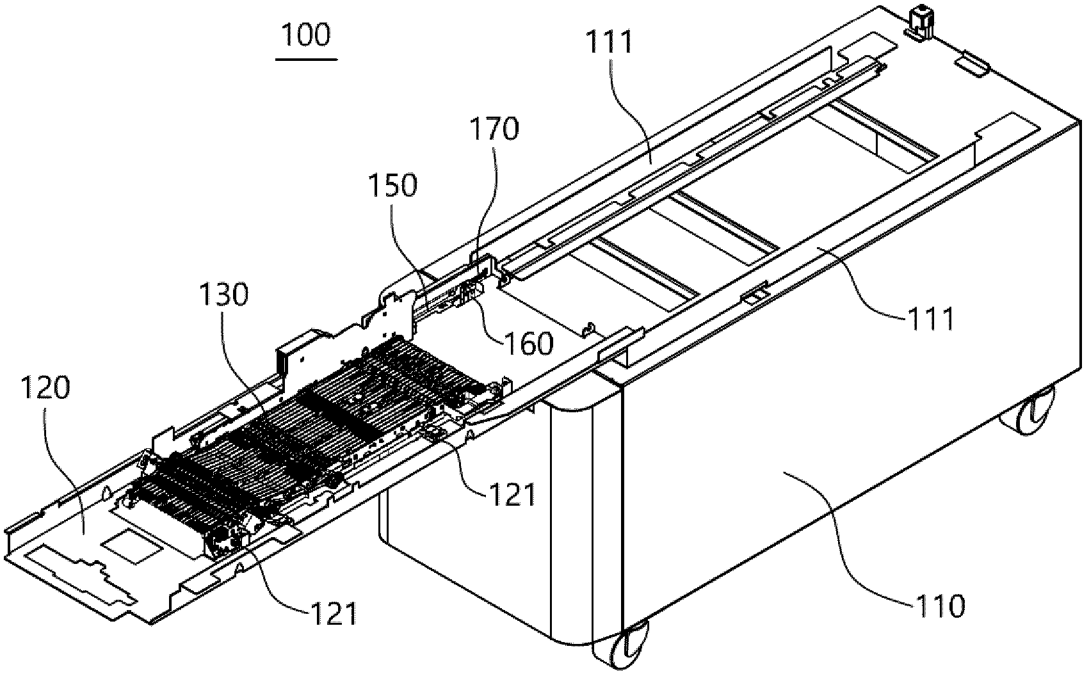
FIG. 5 is a perspective view illustrating a state in which the main frame and the lower transport module are retracted to a second position spaced forward from the upper side of the body in the banknote processing apparatus according to the present disclosure.
Figure 6:
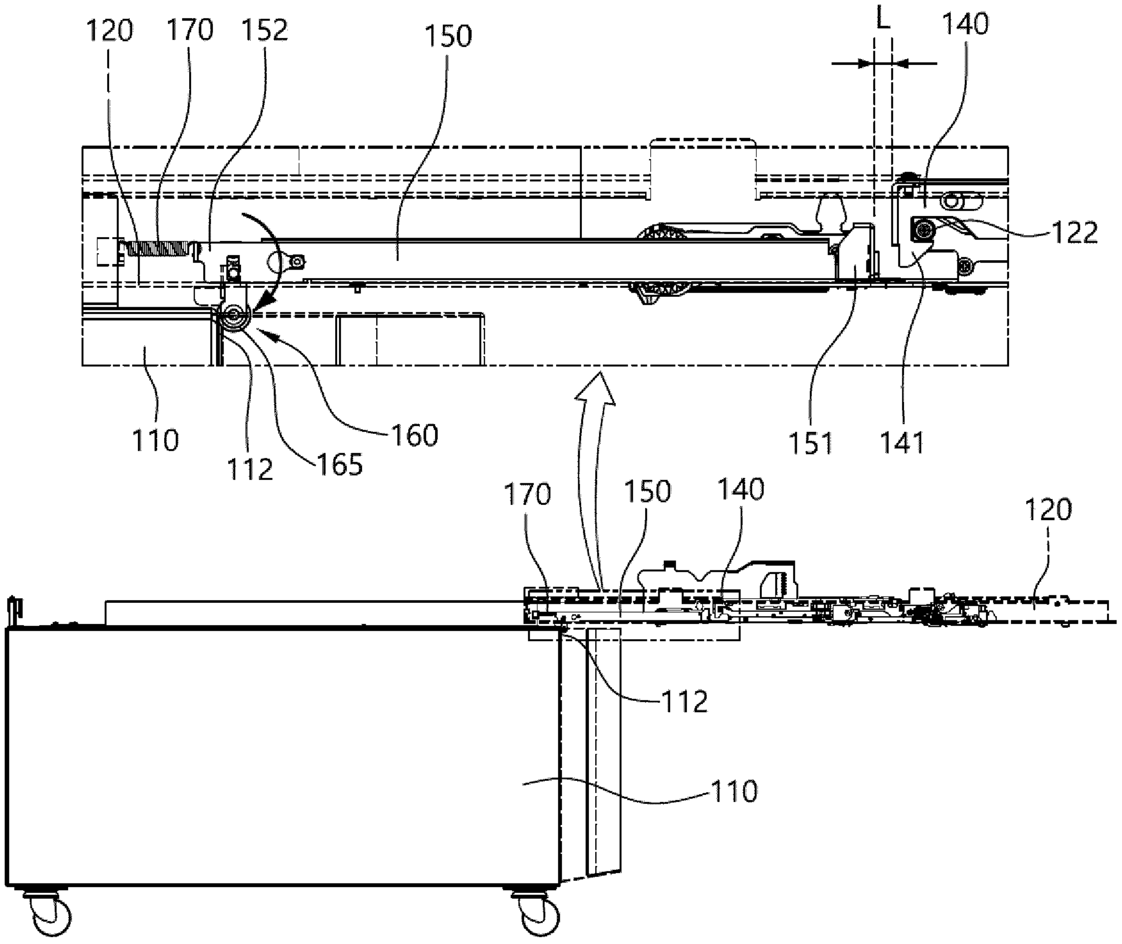
FIG. 6 is a left side view of FIG. 5.
Figure 7:
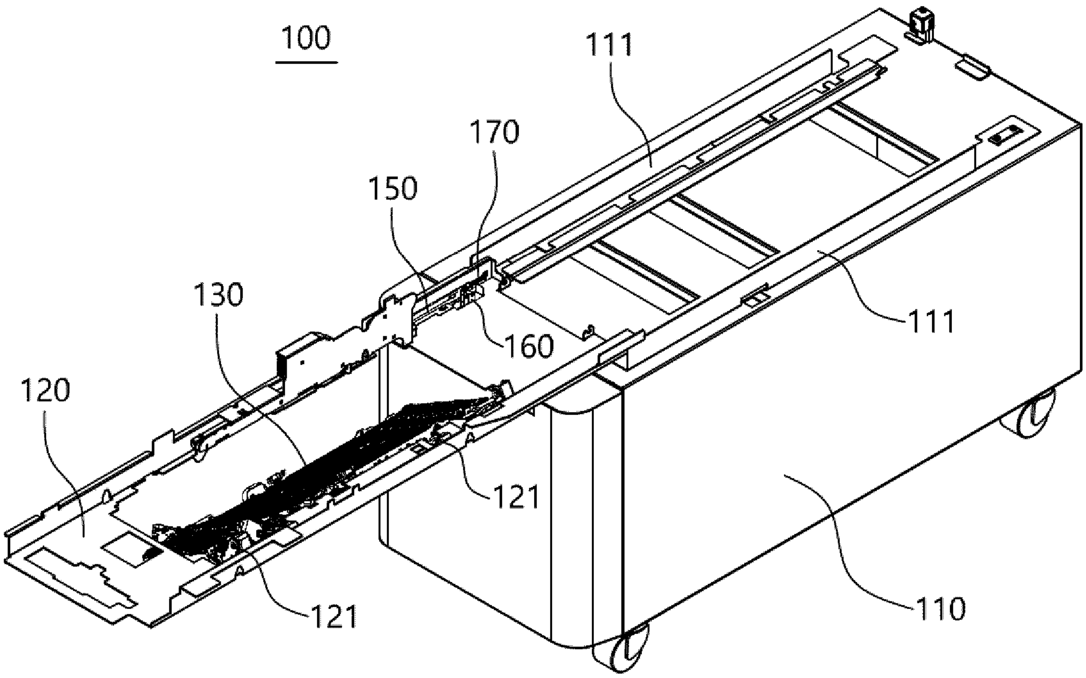
FIG. 7 is a perspective view illustrating a state in which the lower transport module has rotated downward about a hinge part after the main frame and the lower transport module have been extracted to a second position in the banknote processing apparatus according to the present disclosure.
Figure 8:
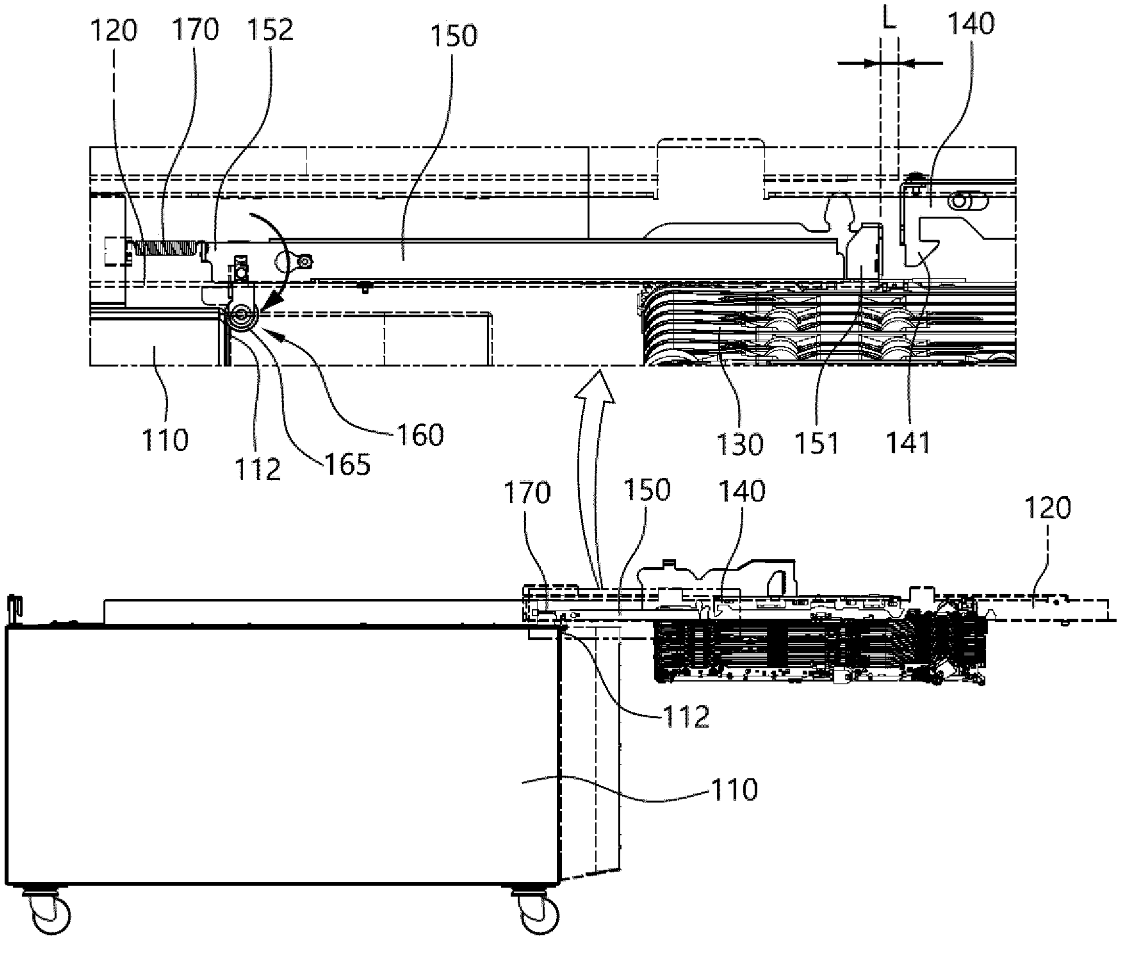
FIG. 8 is a left side view of FIG. 7.

FIGS. 3 and 4 illustrate a state in which the main frame 120 and the lower transport module 130 are retracted to the first position located on the upper side of the body 110 in the banknote processing apparatus 100 according to the present disclosure, FIGS. 5 and 6 illustrate a state in which the main frame 120 and the lower transport module 130 are extracted to the second position spaced forward from the upper side of the body 110 in the banknote processing apparatus 100 according to the present disclosure, and FIGS. 7 and 8 illustrate a state in which the lower transport module 130 has rotated downward about the hinge part 121 after the main frame 120 and the lower transport module 130 have been extracted to the second position in the banknote processing apparatus 100 according to the present disclosure.

The body 110 may be a safe which is connected to a transport path formed between the lower transport module 130 and an upper transport module (not illustrated) provided thereon and in which a banknote is stored, guide rails 111 for guiding movement of the main frame 120 in the front-rear direction are provided on both sides of the upper side of the body 110, and the catching step 112 by which the rotation member 160 is caught in a state in which the main frame 120 and the lower transport module 130 are moved to the second position is formed at the upper portion of the front surface of the body 110.

The lower transport module 130 is seated and supported on the main frame 120, and guide grooves (not illustrated) moved along the guide rails 111 in the front-rear direction may be formed at both ends of the main frame 120.

For maintenance of the transport path, the lower transport module 130 is provided to be vertically rotatable about the hinge part 121 provided at the one end of the main frame 120 between the horizontal state and the downwardly inclined state. That is, during the maintenance of the transport path, the lower transport module 130 rotates downward to be inclined downward about the hinge part 121 so that the transport path is opened, and when the maintenance of the transport path is completed, the lower transport module 130 rotates upward and is thus locked by the first locking member 140 provided at the other end of the main frame 120.

The first locking member 140 includes a hook part 141 that is caught by a catching protrusion 122 provided at the other end of the main frame 120 in a state in which the lower transport module 130 has rotated upward and is uncaught from the catching protrusion 122 in a state in which the lower transport module 130 has rotated downward, and the first locking member 140 may be provided to move forward or rearward within the predetermined gap range in the front-rear direction. A handle part 142 (see FIG. 10) may be provided at an upper end of the first locking member 140 so that an operator may move the first locking member 140 forward or rearward while holding the handle part 142 by hand.

In a state in which the lower transport module 130 has moved to the first position and thus the rotation member 160 rotates to come into contact with the upper surface of the body 110, the link member 150 moves forward and is thus operated to prevent movement of the hook part 141 in the front-rear direction because a front end 151 of the link member 150 is in contact with a rear end surface of the hook part 141 (see FIG. 4). In a state in which the lower transport module 130 has moved to the second position and thus the rotation member 160 rotates to come into contact with the catching step 112 at the upper portion of the front surface of the body 110, the link member 150 moves rearward and is thus operated to enable the movement of the hook part 141 in the front-rear direction because a predetermined gap L (see FIG. 8) is formed between the front end 151 of the link member 150 and the rear end surface of the hook part 141.

The rotation member 160 is connected to a rear end 152 of the link member 150 and may rotate to come into contact with the catching step 112 at the upper portion of the front surface of the body 110 when both the main frame 120 and the lower transport module 130 move to the second position.

Figure 9:
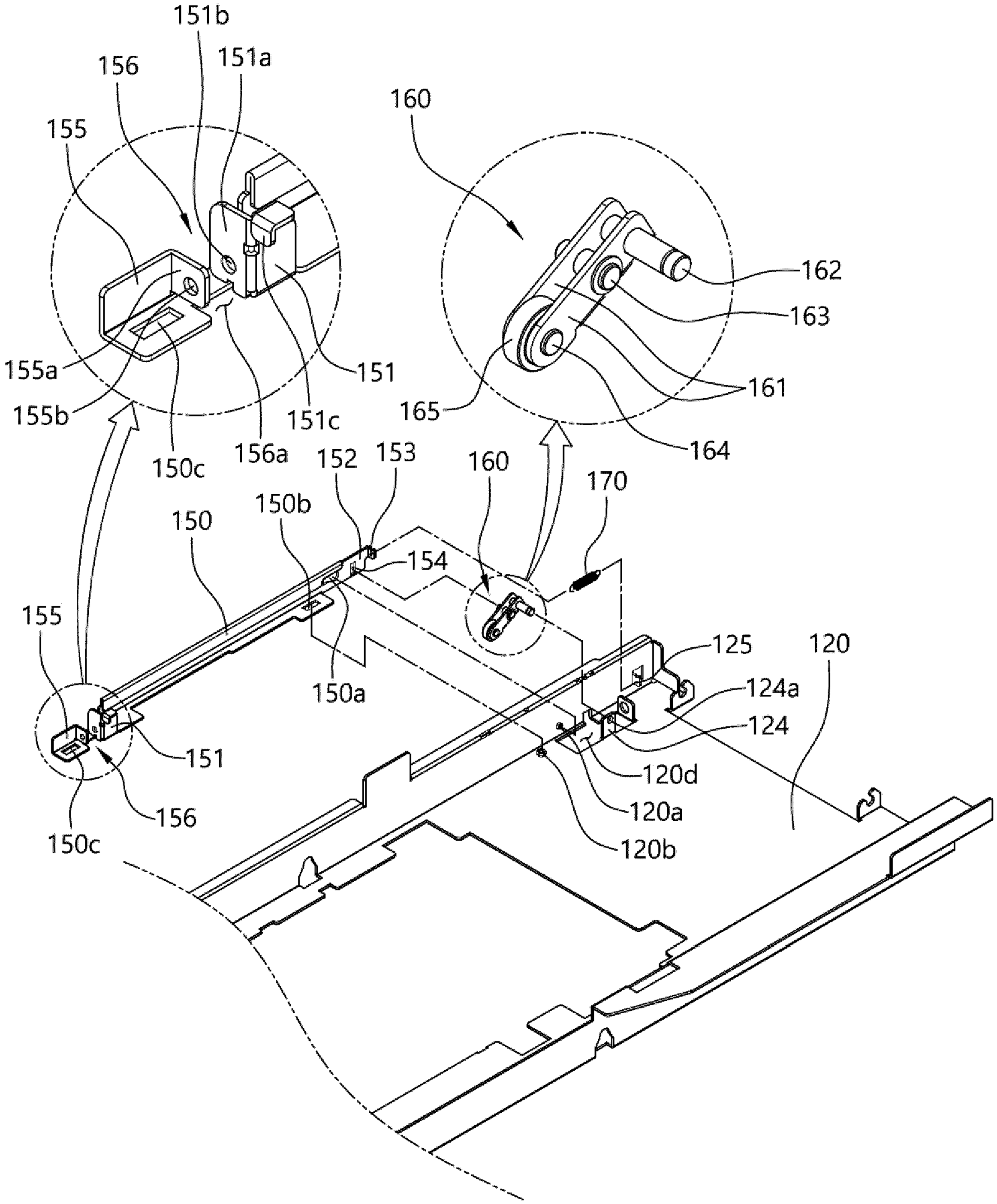
FIG. 9 is an exploded perspective view illustrating a coupling structure of the main frame, a link member, a rotation member, and an elastic member in the banknote processing apparatus according to the embodiment of the present disclosure.

Referring to FIG. 9, the rotation member 160 includes a body plate 161, a hinge shaft 162 coupled to an upper portion of the body plate 161, rotatably connected to a rotation member support piece 124 provided at the other end of the main frame 120, and forming a center of rotation of the rotation member 160, an intermediate shaft 163 coupled to a middle portion of the body plate 161 and inserted into an intermediate shaft insertion hole 154 formed in a slot shape in a vertical direction at a rear end of the link member 150, a roller support shaft 164 coupled to a lower portion of the body plate 161, and a roller 165 rotatably coupled to the roller support shaft 164 and in contact with the upper surface of the body 110 or the catching step 112 at the upper portion of the front surface of the body 110.

Further, the banknote processing apparatus 100 may further include a first elastic member 170 that elastically supports the link member 150 so that the link member 150 is pulled rearward. The first elastic member 170 may be configured in a tension spring, one end of the first elastic member 170 may be supported by an elastic member support piece 153 provided at the rear end of the link member 150, and the other end of the first elastic member 170 may be supported by an elastic member support piece 125 provided in the main frame 120.

As the intermediate shaft 163 of the rotation member 160 is inserted into and connected to the intermediate shaft insertion hole 154 of the link member 150, the movement of the link member 150 in the front-rear direction and the rotation of the rotation member 160 are performed in conjunction with each other.

That is, when the main frame 120 and the lower transport module 130 move to the first position and the rotation member 160 comes into contact with the upper surface of the body 110 and thus rotates about the hinge shaft 162 in one direction, the link member 150 moves forward. In this case, a catching piece 151*c* formed at the front end 151 of the link member 150 is in contact with the hook part 141 of the first locking member 140 so that the first locking member 140 is maintained in a locked state.

In contrast, when the main frame 120 and the lower transport module 130 move to the second position and the rotation member 160 rotates about the hinge shaft 162 in an opposite direction to the one direction under a pulling force of the first elastic member 170 and thus comes into contact with the catching step 122 at the upper portion of the front surface of the body 110, the link member 150 moves rearward. In this case, the catching piece 151*c* formed at the front end 151 of the link member 150 is spaced apart from the hook part 141 of the first locking member 140 with the predetermined gap L, the first locking member 140 moves rearward, and thus unlocking of the first locking member 140 is possible.

Meanwhile, referring to FIG. 9, as components for enabling the link member 150 to move within the predetermined gap range in the front-rear direction, a plurality of guide protrusions 120*a*, 120*b*, and 120*c* (see FIGS. 9 and 11) are formed in the main frame 120, and a plurality of guide holes 150*a*, 150*b*, and 150*c* having slot shapes having a length in the front-rear direction, into which the plurality of guide protrusions 120*a*, 120*b*, and 120*c* are inserted, are formed in the link member 150.

Further, a through-hole 120*d* through which the rotation member 160 passes and which provides a rotatable passage is formed in the main frame 120.

Figure 10:
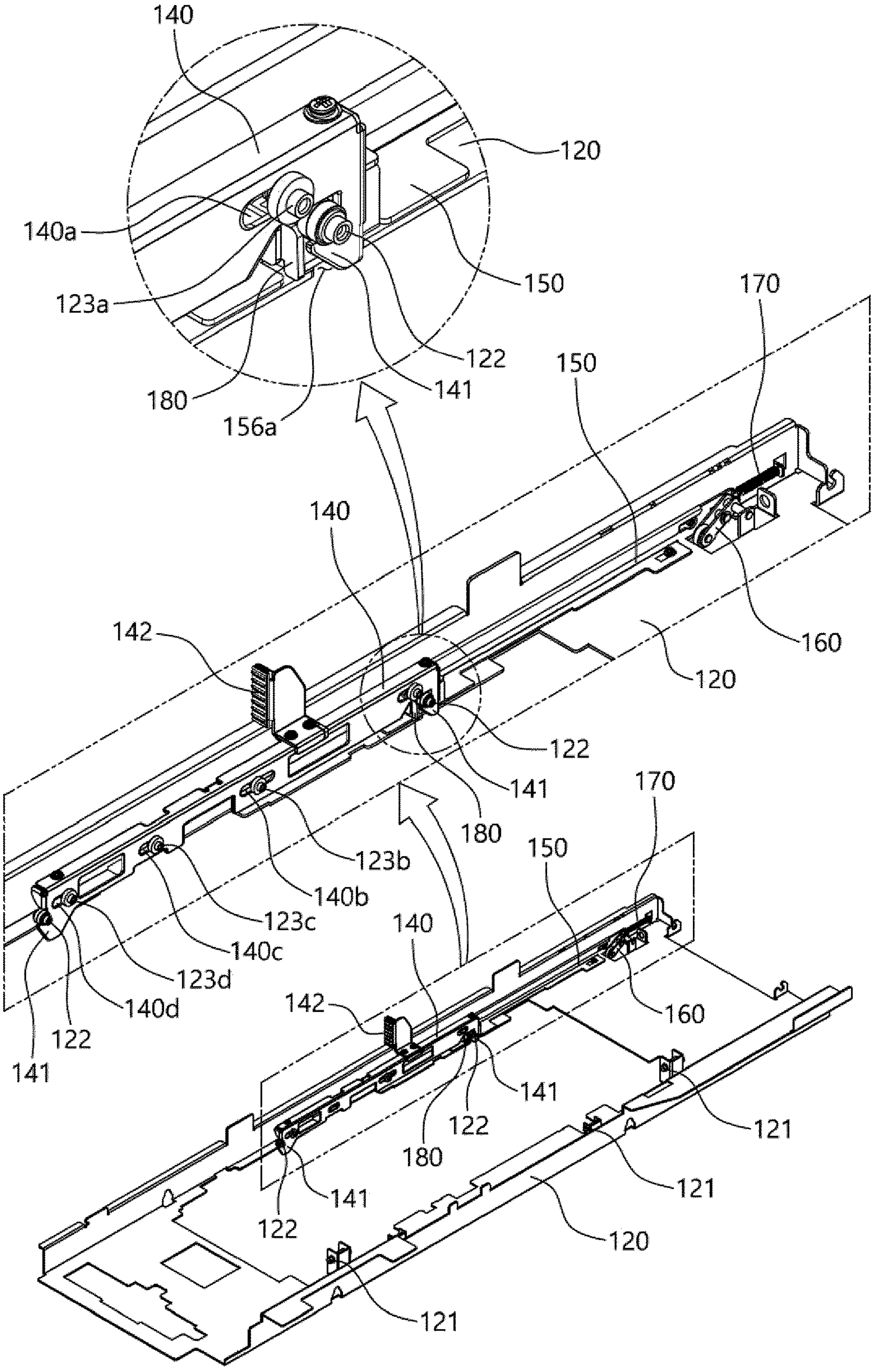
FIG. 10 is a partial perspective view illustrating an operation state of a first locking member, a second locking member, and the rotation member in the state of FIG. 3.

Further, referring to FIG. 10, as components for enabling the first locking member 140 to move within the predetermined gap range in the front-rear direction, a plurality of guide protrusions 123*a*, 123*b*, 123*c*, and 123*d* are formed in the main frame 120, and a plurality of guide holes 140*a*, 140*b*, 140*c*, and 140*d* having slot shapes having a length in the front-rear direction, into which the plurality of guide protrusions 123*a*, 123*b*, 123*c*, and 123*d* are inserted, are formed in the first locking member 140.

Referring to FIGS. 9 to 14, the link member 150 is provided with a second locking member mounting part 156. The second locking member mounting part 156 may be provided between a front side surface 151*a* of the front end 151 of the link member 150 and a rear side surface 155*a* of a support bracket 155 provided at a position spaced forward from the front side surface 151*a*.

The second locking member 180 may include a body part 181 rotatably provided in the link member 150, a shaft 182 forming a center of rotation of the body part 181 and having both ends coupled to a support hole 155*b* (see FIG. 9) formed in the link member 150, and a second elastic member 183 that elastically supports the body part 181 in a downwardly rotating direction.

A protrusion 181*a* may be formed on one side of the body part 181, and a side frame 126 (see FIG. 12) positioned such that an upper end thereof is in contact with a lower end of the protrusion 181*a* in a state in which the lower transport module 130 has rotationally moved upward may be provided on the other side of the lower transport module 130.

A through-hole 156*a* (see FIG. 9) providing a passage through which the body part 181 vertically passes and moves is formed in a lower portion between the front side surface 151*a* and the rear side surface 155*a*, and the through-hole 120*d* (see FIG. 1) providing a passage through which the body part 181 vertically passes and moves is formed in the main frame 120.

Figure 11:
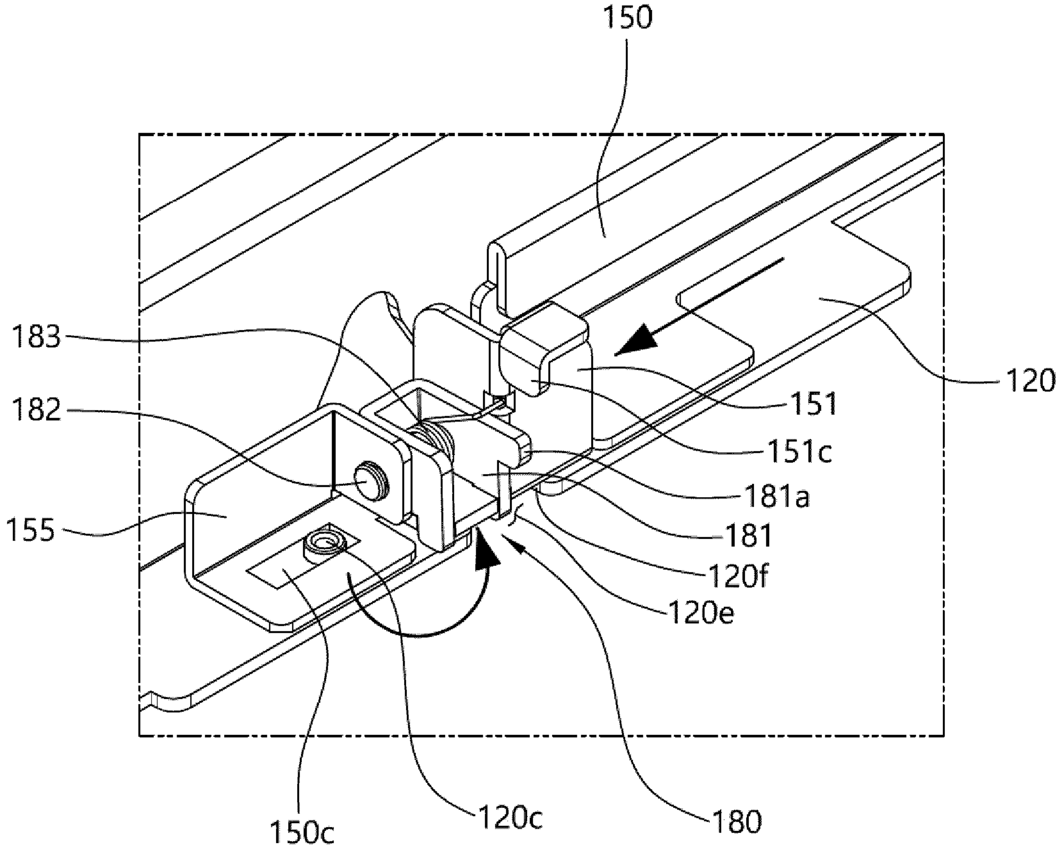
FIGS. 11 and 12 are partial perspective views illustrating an operation state of the second locking member in the state of FIG. 10.
Figure 12:
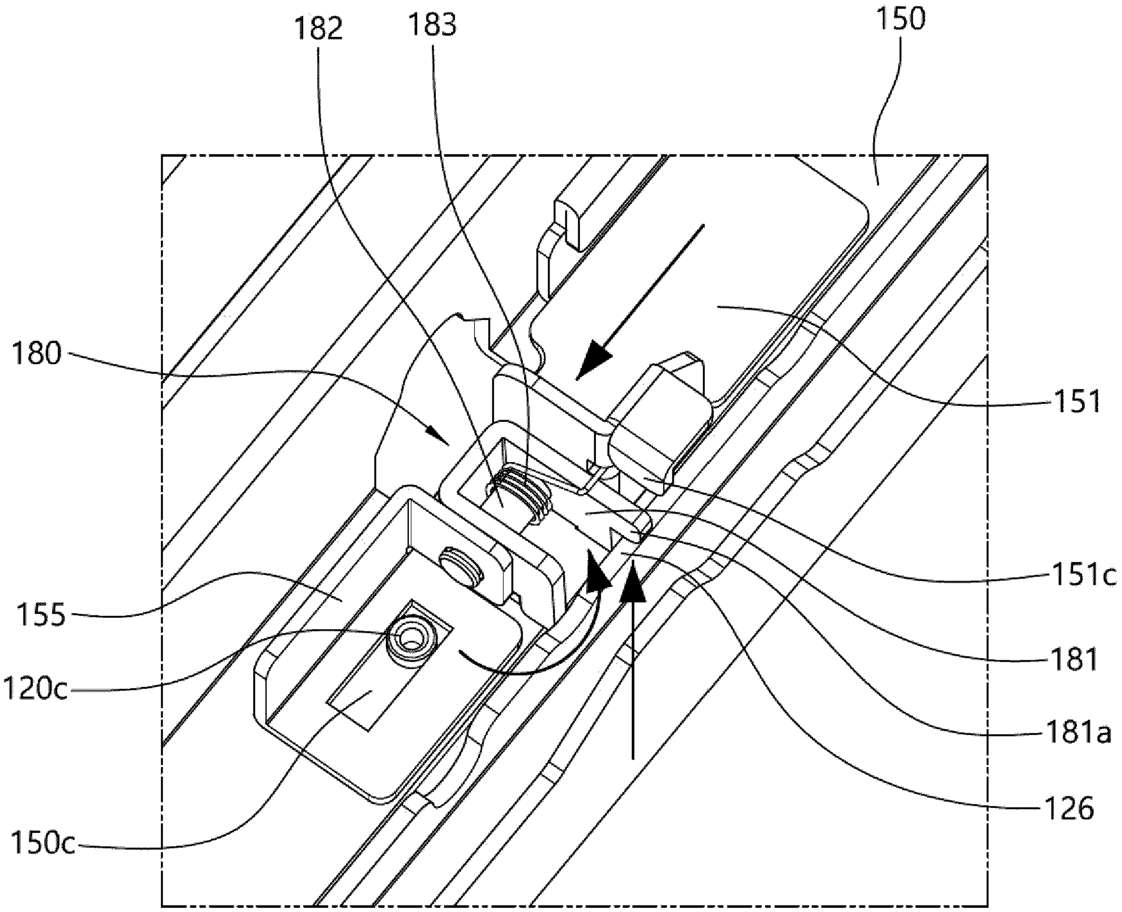

Referring to FIGS. 10 to 12, in a state in which the lower transport module 130 has rotated upward and moved to the first position, an upper end of the side frame 126 is in contact with the protrusion 181*a* to move the body part 181 of the second locking member 180 so that the body part 181 rotates upward, the link member 150 moves forward so that the body part 181 of the second locking member 180 is positioned on an upper surface of the main frame 120, and thus an unlocked state in which the link member 150 may move forward or rearward is formed.

Figure 13:
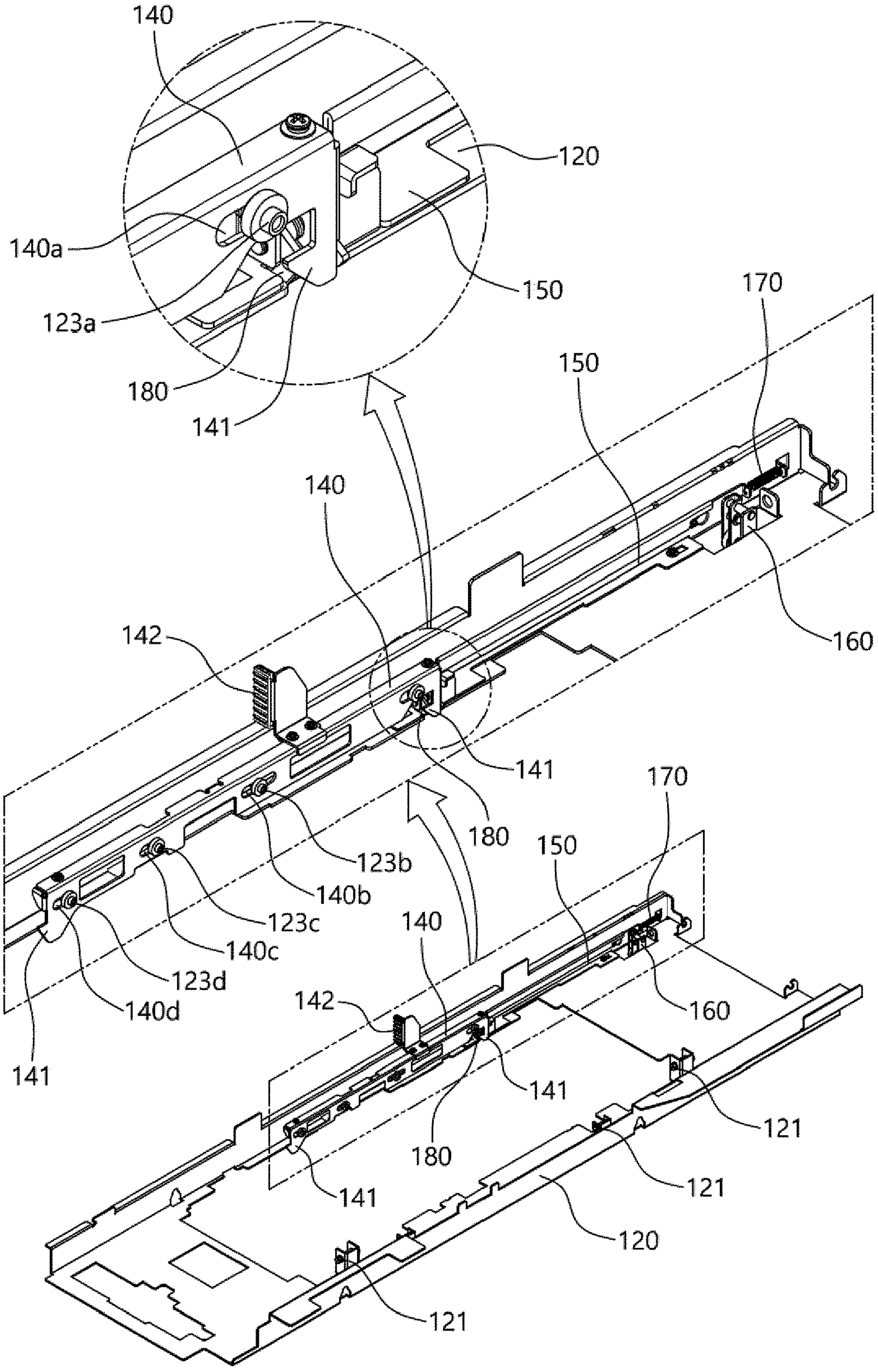
FIG. 13 is a partial perspective view illustrating an operation state of the first locking member, the second locking member, and the rotation member in the state of FIG. 7.
Figure 14:
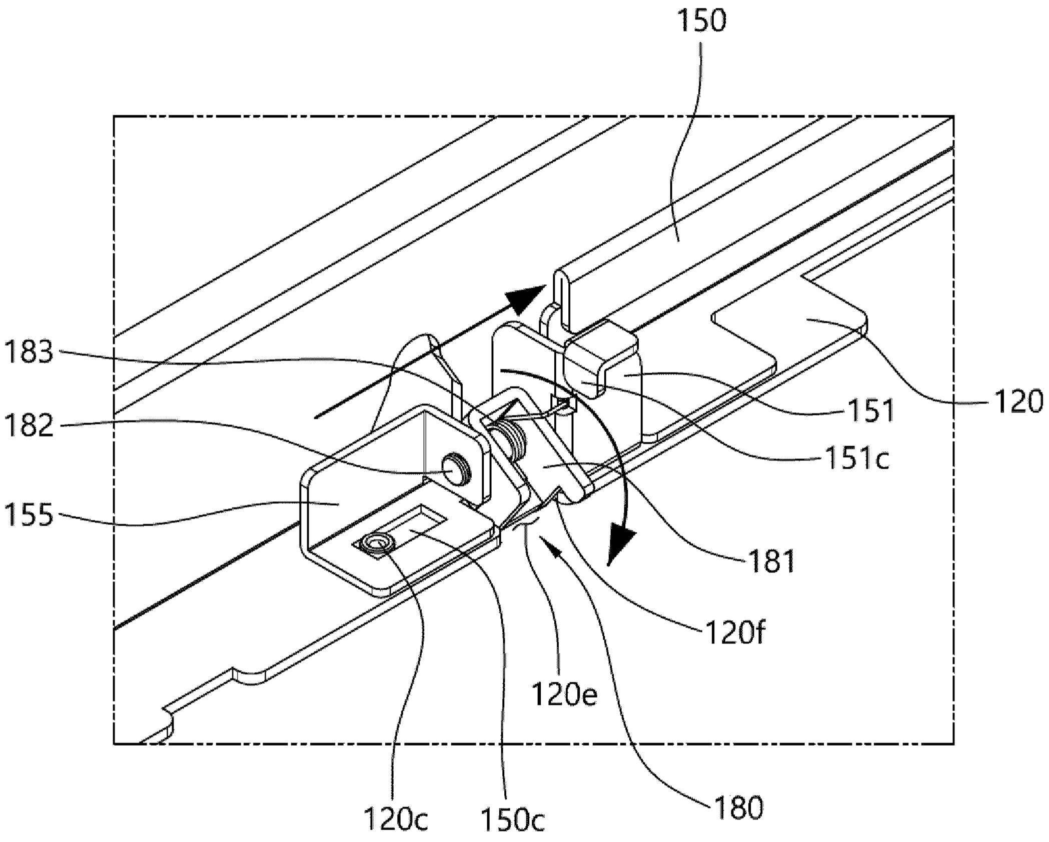
FIG. 14 is partial perspective views illustrating the operation state of the second locking member in the state of FIG. 13.

Referring to FIGS. 13 and 14, in a state in which the lower transport module 130 has moved to the second position and rotates downward, the side frame 126 is spaced apart from the protrusion 181*a*, the link member 150 moves rearward, the body part 181 of the second locking member 180 passes through a through-hole 120*e* and rotates downward by an elastic force of the second elastic member 183 and is thus caught by a side catching part 120*f* of the main frame 120 provided on one side of the through-hole 120*e*, and thus a locking state in which the movement of the link member 150 in the front-rear direction is prevented is formed.

As described above, according to a configuration of the present disclosure, the first locking member 140 is unlockable only in a state in which the entire lower transport module 130 has moved to the second position. In a state in which the lower transport module 130 has moved to the second position and then rotates downward, the second locking member 140 is locked, the movement of the link member 150 in the front-rear direction and the rotation of the rotation member 160 are prevented, and the lower transport module 130 moves toward the body 110 after rotating downward. Thus, collision and breakage can be solved.

Further, a movable gap L is formed so that the hook part 141 of the first locking member 140 is uncaught by the catching protrusion 122 only in a state in which the lower transport module 130 is extracted by a distance from the first position to the second position, that is, a distance by which the rotation member 160 moves from the upper surface of the body 110 to the catching step 122 at the upper portion of the front surface thereof. Thus, a banknote transport module including the lower transport module 130 may be more stably retracted into the first position without collision with the body 110.

Hereinafter, a configuration and operation of a banknote processing apparatus according to another embodiment of the present disclosure will be described with reference to FIGS. 15 to 18, but detailed descriptions of the configurations overlapping those according the above-described embodiments will be omitted, and components added or changed in the present embodiment will be mainly described.

The present embodiment includes the configuration of the above-described embodiment illustrated in FIGS. 1 to 8 and includes a main frame 1200, a link member 1500, and a second locking member 1800 having structures changed from those of the main frame 120, the link member 150, and the second locking member 180.

In the present embodiment, the second locking member 1800 is elevatably provided on the main frame 120.

Figure 15:
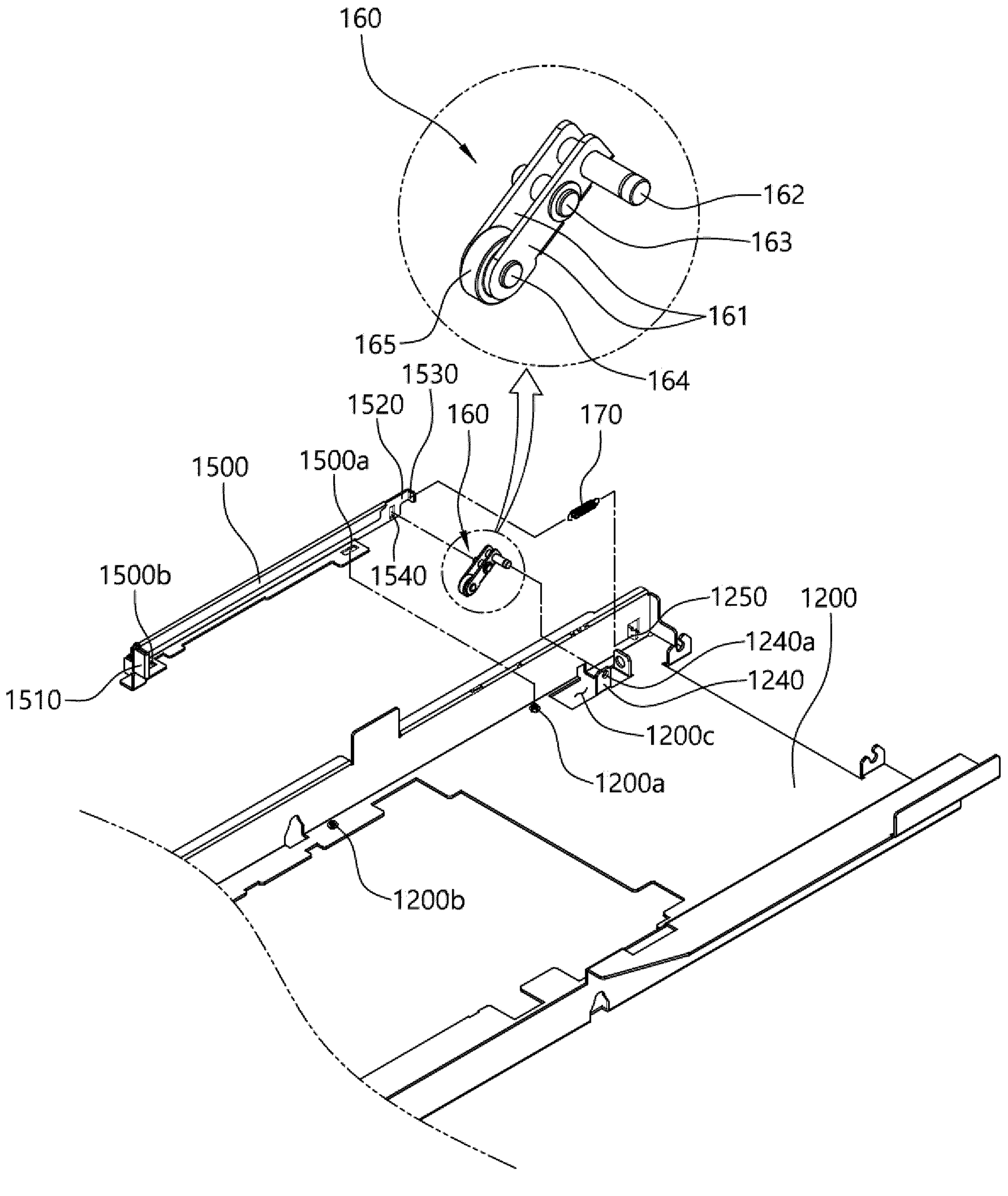
FIG. 15 is an exploded perspective view illustrating a coupling structure of a main frame, a link member, a rotation member, and an elastic member in a banknote processing apparatus according to another embodiment of the present disclosure.

Referring to FIG. 15, the rotation member 160 includes the body plate 161, the hinge shaft 162 coupled to an upper portion of the body plate 161, rotatably connected to a rotation member support piece 1240 provided at the other end of the main frame 1200, and forming the center of rotation of the rotation member 160, the intermediate shaft 163 coupled to a middle portion of the body plate 161 and inserted into an intermediate shaft insertion hole 1540 formed in a slot shape in a vertical direction at a rear end of the link member 1500, the roller support shaft 164 coupled to the lower portion of the body plate 161, and the roller 165 rotatably coupled to the roller support shaft 164 and in contact with the upper surface of the body 110 or the catching step 112 at the upper portion of the front surface of the body 110.

Further, the banknote processing apparatus 100 may further include a first elastic member 170 that elastically supports the link member 1500 so that the link member 1500 is pulled rearward. The first elastic member 170 may be configured in a tension spring, the one end of the first elastic member 170 may be supported by an elastic member support piece 1530 provided at the rear end of the link member 1500, and the other end of the first elastic member 170 may be supported by an elastic member support piece 1250 provided in the main frame 1200.

As the intermediate shaft 163 of the rotation member 160 is inserted into and connected to the intermediate shaft insertion hole 1540 of the link member 1500, the movement of the link member 1500 in the front-rear direction and the rotation of the rotation member 160 are performed in conjunction with each other.

That is, when the main frame 1200 and the lower transport module 130 move to the first position and the rotation member 160 comes into contact with the upper surface of the body 110 and thus rotates about the hinge shaft 162 in the one direction, the link member 1500 moves forward. In this case, a catching piece 1510*c* formed at the front end 1510 of the link member 1500 is in contact with the hook part 141 of the first locking member 140 so that the first locking member 140 is maintained in a locked state.

In contrast, when the main frame 1200 and the lower transport module 130 move to the second position and the rotation member 160 rotates about the hinge shaft 162 in the opposite direction to the one direction under the pulling force of the first elastic member 170 and thus comes into contact with a catching step 1220 at the upper portion of the front surface of the body 110, the link member 1500 moves rearward. In this case, the catching piece 1510*c* formed at the front end 1510 of the link member 1500 is spaced apart from the hook part 141 of the first locking member 140 with the predetermined gap L, the first locking member 140 moves rearward, and thus unlocking of the first locking member 140 is possible.

Meanwhile, referring to FIG. 15, as components for enabling the link member 1500 to move within the predetermined gap range in the front-rear direction, a plurality of guide protrusions 1200*a*, 1200*b*, and 1200*c* (see FIGS. 15 and 17) are formed in the main frame 1200, and a plurality of guide holes 1500*a* and 1500*b* having slot shapes having a length in the front-rear direction, into which the plurality of guide protrusions 1200*a* and 1200*b* are inserted, are formed in the link member 1500.

Further, a through-hole 1200*c* through which the rotation member 160 passes and which provides a rotatable passage is formed in the main frame 1200.

Figure 16:
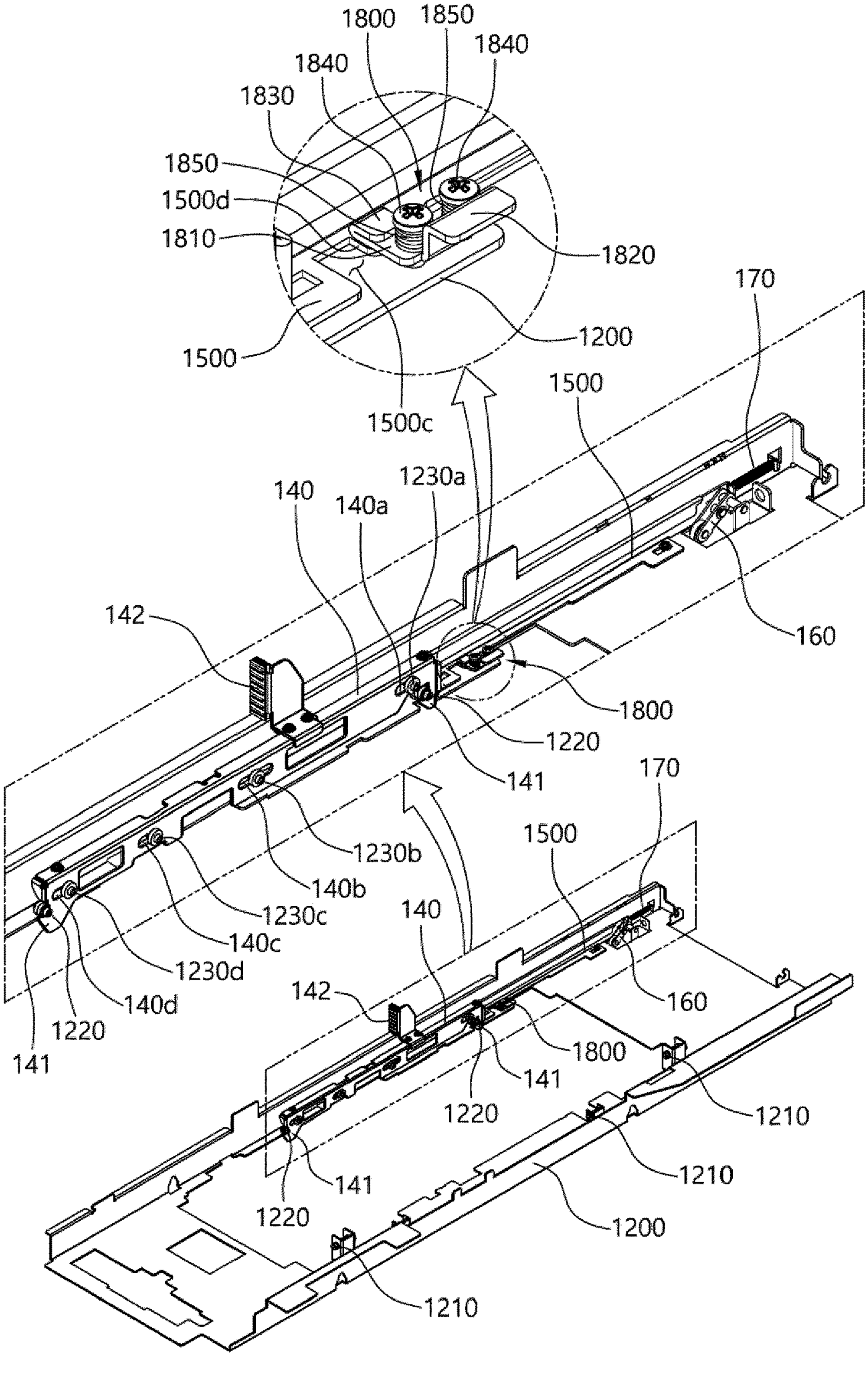
FIG. 16 is a partial perspective view illustrating the operation state of the first locking member, the second locking member, and the rotation member in the state of FIG. 3.

Further, referring to FIG. 16, as components for enabling the first locking member 140 to move within the predetermined gap range in the front-rear direction, a plurality of guide protrusions 1230*a*, 1230*b*, 1230*c*, and 1230*d* are formed in the main frame 1200, and a plurality of guide holes 140*a*, 140*b*, 140*c*, and 140*d* having slot shapes having a length in the front-rear direction, into which the plurality of guide protrusions 1230*a*, 1230*b*, 1230*c*, and 1230*d* are inserted, are formed in the first locking member 140.

Figure 17:
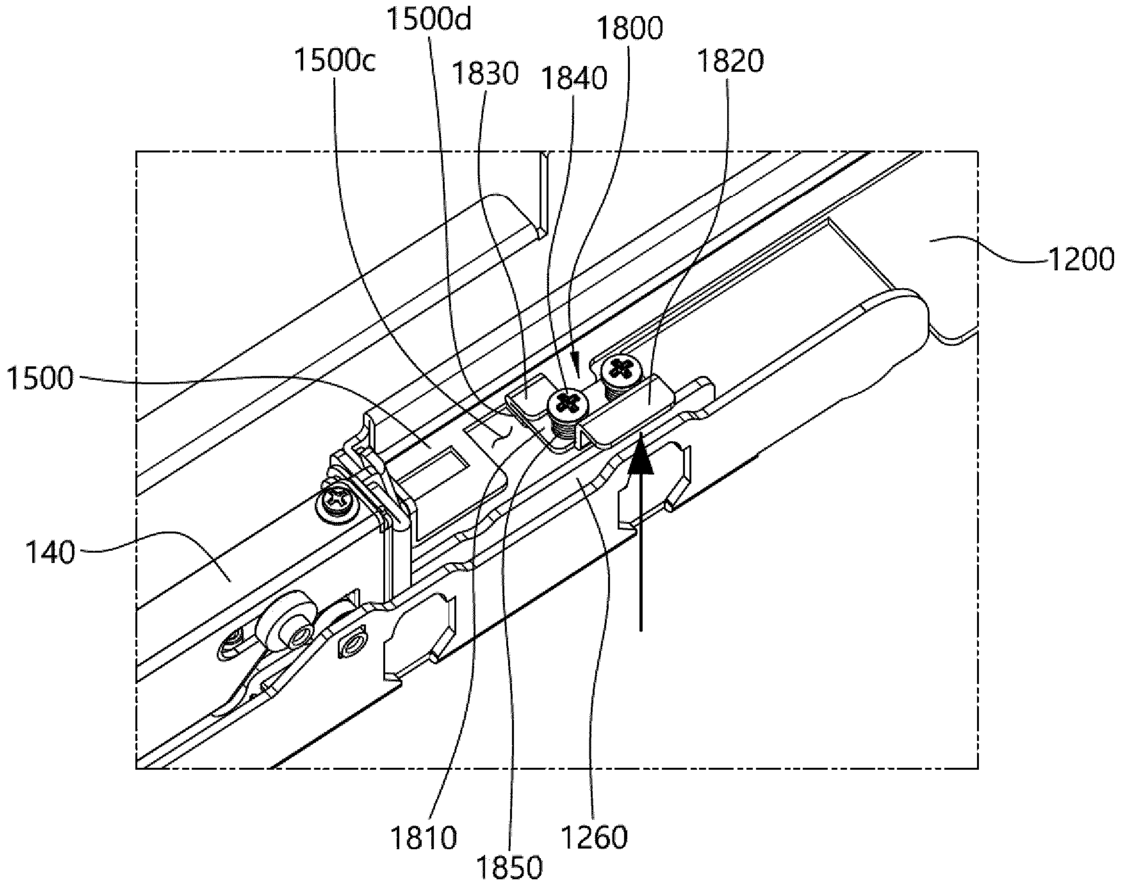
FIG. 17 is partial perspective views illustrating the operation state of the second locking member in the state of FIG. 3.
Figure 18:
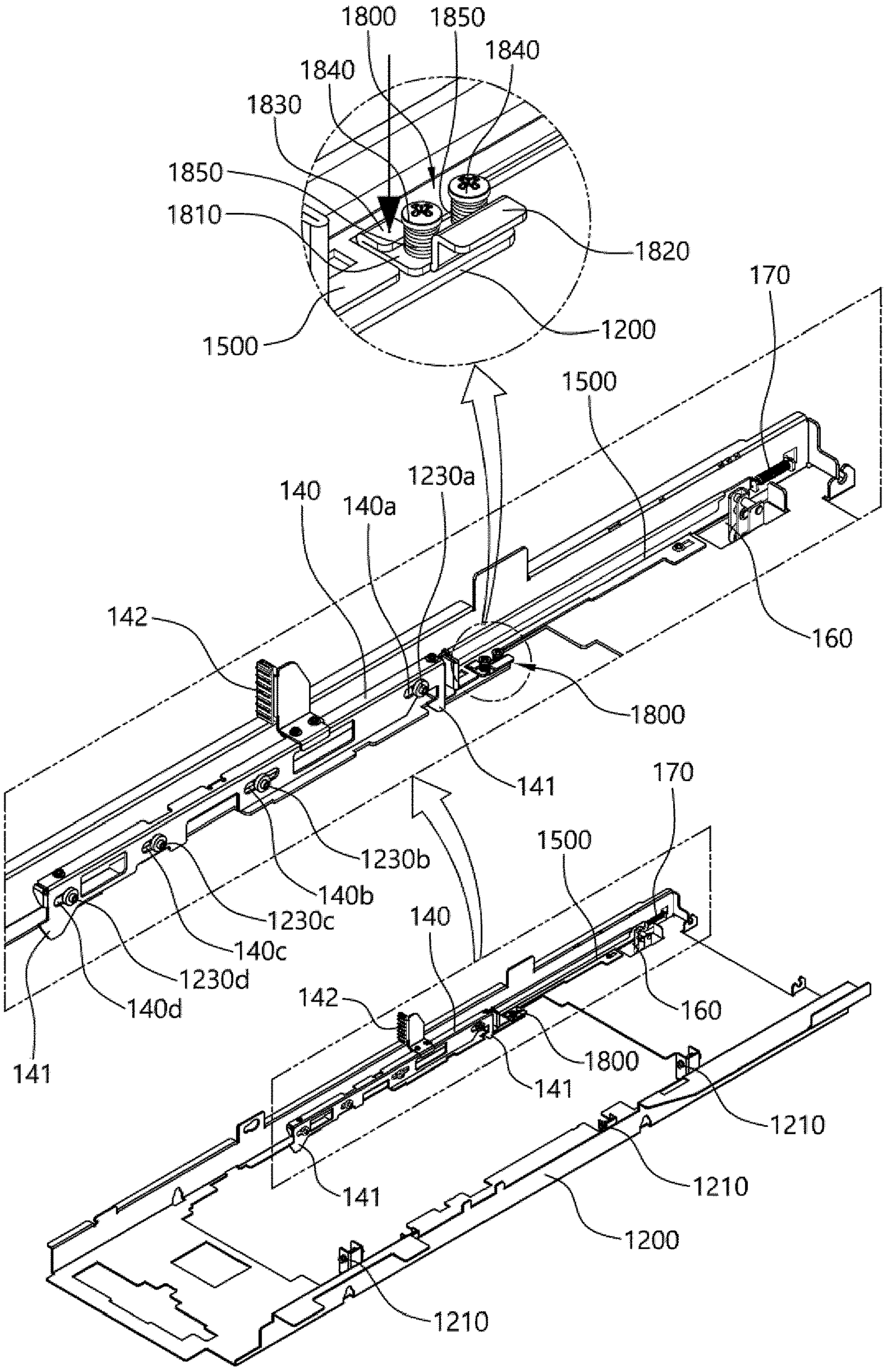
FIG. 18 is a partial perspective view illustrating the operation state of the first locking member, the second locking member, and the rotation member in the state of FIG. 7.

Referring to FIGS. 16 to 18, the second locking member 1800 may include a body part 1810 elevatably provided on the main frame 1200, a support rod 1840 that guides elevation movement of the body part 1810, and a second elastic member 1850 having both ends supported by an upper end of the support rod 1840 and an upper surface of the body part 1810 to elastically support the body part 1810 in a direction toward an upper surface of the main frame 1200.

A protrusion 1820 may be formed on one side of the body part 1810, and a side frame 1260 (see FIG. 17) positioned so that an upper end thereof is in contact with a lower end of the protrusion 1820 in a state in which the lower transport module 130 has rotationally moved upward may be provided on the other side of the lower transport module 130.

A catching piece 1830 may be formed on the other side of the body part 1810, and a through-hole 1500*c* providing a passage through which the catching piece 1830 vertically passes and moves may be formed in the link member 1500.

Referring to FIGS. 16 to 17, in a state in which the lower transport module 130 has rotated upward and moved to the first position, an upper end of the side frame 1260 is in contact with the protrusion 1820 to move the body part 181 of the second locking member 1800 upward, the link member 1500 moves forward so that the catching piece 1830 of the second locking member 1800 is positioned on an upper surface of the link member 1500, and thus an unlocked state in which the link member 1500 may move forward or rearward is formed.

Referring to FIG. 18, in a state in which the lower transport module 130 has moved to the second position and rotated downward, the side frame 1260 is spaced apart from the protrusion 1820, the link member 1500 moves rearward, the catching piece 1830 of the second locking member 1800 passes through the through-hole 1500*c* and rotates downward under an elastic force of the second elastic member 1850 and is thus caught by a side catching part 1500*d* of the link member 1500 provided on one side of the through-hole 1500*c*, and thus a locking state in which the movement of the link member 1500 in the front-rear direction is prevented is formed.

As described above, according to a configuration of the present disclosure, the first locking member 140 is unlockable only in a state in which the entire lower transport module 130 has moved to the second position. In a state in which the lower transport module 130 has moved to the second position and then rotated downward, the second locking member 140 is locked, the movement of the link member 1500 in the front-rear direction and the rotation of the rotation member 160 are prevented, and the lower transport module 130 moves toward the body 110 after rotating downward. Thus, collision and breakage can be solved.

Further, the movable gap L is formed so that the hook part 141 of the first locking member 140 is uncaught by the catching protrusion 1220 only in a state in which the lower transport module 130 is extracted by a distance from the first position to the second position, that is, a distance by which the rotation member 160 moves from the upper surface of the body 110 to the catching step 1220 at the upper portion of the front surface thereof. Thus, the banknote transport module including the lower transport module 130 may be more stably retracted into the first position without collision with the body 110.

According to a banknote processing apparatus according to the present disclosure, a locking unit is provided to allow a lower transport module to move only in a state in which the lower transport module is locked to a main frame and completely closed, and thus a banknote transport module can be stably retracted into an upper portion of a body without collision with the body after maintenance work.

Further, a movable gap is formed such that a hook part is unlocked from a catching protrusion only in a state in which the banknote transport module is extracted by a distance to a set position toward a front side of the body, and thus the banknote transport module can be more stably retracted without collision with the body.

As described above, the present disclosure is not limited to the above-described embodiments, obvious modifications could be made by those skilled in the art to which the present disclosure pertains without departing from the technical spirit of the present disclosure claimed by the appended claims, and the obvious modifications belong to the scope of the present disclosure.

What is claimed is:

1. A banknote processing apparatus comprising:

a body in which a banknote is stored and a catching step is formed at an upper portion of a front surface thereof;

a main frame that moves forward or rearward between a first position located on an upper side of the body and a second position spaced forward from the upper side of the body;

a lower transport module that vertically rotates about a hinge part provided at one end of the main frame between a horizontal state and a downwardly inclined state and forms a lower portion of a transport path through which the banknote is transported;

a first locking member configured to lock or unlock the other end of the lower transport module to regulate the rotation of the lower transport module;

a link member having a predetermined length on the main frame in a front-rear direction and moving forward or rearward within a predetermined gap range;

a rotation member connected to the link member in the main frame to rotate in conjunction with the forward or rearward movement of the link member, configured to rotate to come into contact with an upper surface of the body when the lower transport module moves to the first position, and configured to rotate to come into contact with the catching step at the upper portion of the front surface of the body when the lower transport module moves to the second position; and a second locking member that is locked to prevent the forward or rearward movement of the link member in a state in which the lower transport module has rotated downward and unlocked to enable the forward or rearward movement of the link member in a state in which the lower transport module has rotated upward.

2. The banknote processing apparatus of claim 1, wherein the first locking member includes a hook part that is caught by a catching protrusion provided at the other end of the main frame in a state in which the lower transport module has rotated upward and is uncaught from the catching protrusion in a state in which the lower transport module 130 has rotated downward, and the first locking member is provided to move forward or rearward within the predetermined gap range in the front-rear direction.

3. The banknote processing apparatus of claim 2, wherein, in a state in which the lower transport module has moved to the first position and thus the rotation member has rotated to come into contact with the upper surface of the body, the link member moves forward and is thus operated to prevent movement of the hook part in the front-rear direction because a front end of the link member is in contact with a rear end surface of the hook part, and in a state in which the lower transport module has moved to the second position and thus the rotation member has rotated to come into contact with the catching step at the upper portion of the front surface of the body, the link member moves rearward and is thus operated to enable the movement of the hook part in the front-rear direction because a predetermined gap L is formed between the front end of the link member and the rear end surface of the hook part.

4. The banknote processing apparatus of claim 3, wherein the rotation member is connected to a rear end of the link member and rotates to come into contact with the catching step at the upper portion of the front surface of the body when both the main frame and the lower transport module move to the second position.

5. The banknote processing apparatus of claim 1, wherein the rotation member includes:

a body plate;

a hinge shaft coupled to an upper portion of the body plate, rotatably connected to a rotation member support piece provided at the other end of the main frame, and forming a center of rotation of the rotation member;

an intermediate shaft coupled to a middle portion of the body plate and inserted into an intermediate shaft insertion hole formed in a slot shape in a vertical direction at a rear end of the link member;

a roller support shaft coupled to a lower portion of the body plate; and a roller rotatably coupled to the roller support shaft and in contact with the upper surface of the body or the catching step at the upper portion of the front surface of the body.

6. The banknote processing apparatus of claim 5, further comprising:

a first elastic member that elastically supports the link member so that the link member is pulled rearward.

7. The banknote processing apparatus of claim 1, wherein the second locking member is provided in the link member to be vertically rotatable.

8. The banknote processing apparatus of claim 7, wherein the second locking member includes:

a body part rotatably provided in the link member;

a shaft forming a center of rotation of the body part and coupled to the link member; and a second elastic member that elastically supports the body part in a downwardly rotating direction.

9. The banknote processing apparatus of claim 8, wherein a protrusion is formed on one side of the body part, and a side frame positioned such that an upper end thereof is in contact with a lower end of the protrusion in a state in which the lower transport module has rotationally moved upward is provided on the other side of the lower transport module.

10. The banknote processing apparatus of claim 9, wherein a through-hole providing a passage through which the body part vertically passes and moves is formed in the main frame.

11. The banknote processing apparatus of claim 10, wherein, in a state in which the lower transport module has rotated upward and moved to the first position, an upper end of the side frame is in contact with the protrusion to move the body part of the second locking member so that the body part rotates upward, the link member moves forward so that the body part of the second locking member is positioned on an upper surface of the main frame, and thus an unlocked state in which the link member is able to move forward or rearward is formed, and in a state in which the lower transport module has moved to the second position and rotated downward, the side frame is spaced apart from the protrusion, the link member moves rearward, the body part of the second locking member passes through the through-hole and rotates downward under an elastic force of the second elastic member and is thus caught by a side catching part of the main frame provided on one side of the through-hole, and thus a locking state in which the movement of the link member in the front-rear direction is prevented is formed.

12. The banknote processing apparatus of claim 1, wherein the second locking member is elevatably provided on the main frame.

13. The banknote processing apparatus of claim 12, wherein the second locking member includes:

a body part elevatably provided on the main frame;

a support rod configured to guide elevation movement of the body part; and a second elastic member having both ends supported by an upper end of the support rod and an upper surface of the body part to elastically support the body part in a direction toward an upper surface of the main frame.

14. The banknote processing apparatus of claim 13, wherein a protrusion is formed on one side of the body part, and a side frame positioned such that an upper end thereof is in contact with a lower end of the protrusion in a state in which the lower transport module has rotationally moved upward is provided on the other side of the lower transport module.

15. The banknote processing apparatus of claim 14, wherein a catching piece is formed on the other side of the body part, and a through-hole providing a passage through which the catching piece vertically passes and moves is formed in the link member.

16. The banknote processing apparatus of claim 15, wherein, in a state in which the lower transport module has rotated upward and moved to the first position, an upper end of the side frame is in contact with the protrusion to move the body part of the second locking member upward, the link member moves forward so that the catching piece of the second locking member is positioned on an upper surface of the link member, and thus an unlocked state in which the link member is able to move forward or rearward is formed, and in a state in which the lower transport module has moved to the second position and rotated downward, the side frame is spaced apart from the protrusion, the link member moves rearward, the catching piece of the second locking member passes through the through-hole and rotates downward under an elastic force of the second elastic member and is thus caught by a side catching part of the link member provided on one side of the through-hole, and thus a locking state in which the movement of the link member in the front-rear direction is prevented is formed.

* * * * *